(12) United States Patent
Wulff

(10) Patent No.: US 7,018,573 B2
(45) Date of Patent: Mar. 28, 2006

(54) METHOD FOR MAKING A MODIFIED CUBE CORNER RETRO-REFLECTIVE SCREEN

(75) Inventor: Thomas R. Wulff, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 478 days.

(21) Appl. No.: 10/266,800

(22) Filed: Oct. 8, 2002

(65) Prior Publication Data
US 2004/0066554 A1    Apr. 8, 2004

(51) Int. Cl.
*B29D 11/00* (2006.01)

(52) U.S. Cl. ......................................... 264/1.9; 264/2.7

(58) Field of Classification Search ................. 264/1.7, 264/1.9, 2.7, 1.6, 40.1; 425/808, 810; 359/462

See application file for complete search history.

(56) References Cited

U.S. PATENT DOCUMENTS

| 3,684,348 | A | 8/1972 | Rowland |
| 3,712,706 | A | 1/1973 | Stamm |
| 3,817,596 | A | 6/1974 | Tanaka |
| 3,833,285 | A | 9/1974 | Heenan |
| 3,992,080 | A | 11/1976 | Rowland |
| 4,775,219 | A | 10/1988 | Appeldorn et al. |
| 5,948,488 | A * | 9/1999 | Marecki et al. ............... 428/30 |
| 6,375,776 | B1 | 4/2002 | Buoni et al. |
| 6,776,935 | B1 * | 8/2004 | Anderson et al. ............ 264/1.6 |

FOREIGN PATENT DOCUMENTS

| EP | 0 844 056 | 5/1998 |
| EP | 0 924 538 | 6/1999 |
| EP | 1 213 597 | 6/2002 |
| WO | 00/23828 | 4/2000 |

* cited by examiner

*Primary Examiner*—Mathieu D. Vargot
(74) *Attorney, Agent, or Firm*—Frank Pincelli

(57) ABSTRACT

This patent discloses methods for modifying cube corner retroreflective patterns by stretching a cube corner retroreflector. Stretching may either permanent through inelastic stretching usually under heat or elastic stretching using a controlled stretching mechanism.

11 Claims, 7 Drawing Sheets

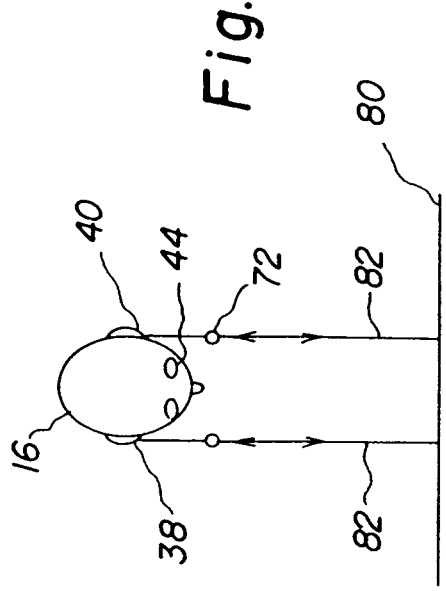
Fig. 6b
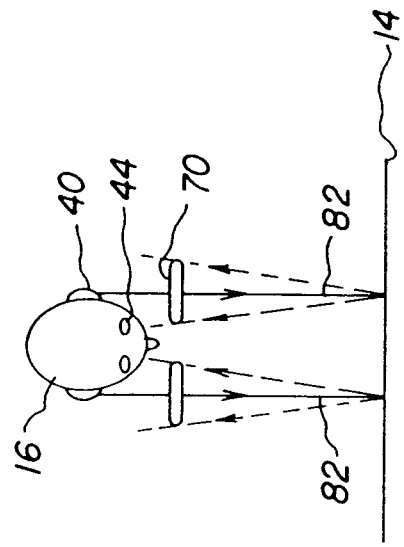
Fig. 6d
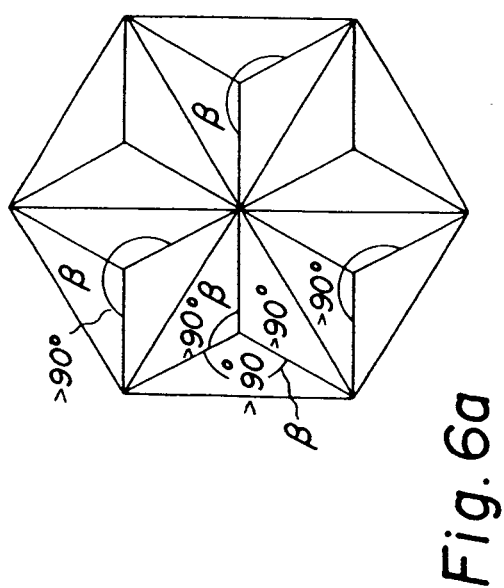
Fig. 6a
Fig. 6c

METHOD FOR MAKING A MODIFIED CUBE CORNER RETRO-REFLECTIVE SCREEN

FIELD OF THE INVENTION

The present invention is directed to cube-corner retroreflective articles, particularly to such articles in which the cube-corner retroreflective elements are modified by stretching the article.

BACKGROUND OF THE INVENTION

Light rays from a true retroreflector will be directed back toward the source parallel to the original light rays. Several applications involving retroreflectors require that the light leaving the article diverge from the incident angel in order to be effective. For example, light from the hedlamps of an oncoming vehicle, reflected back toward the vehicle by a retroreflective sign, must diverge sufficiently as it leaves the sign to reach the eyes of the driver, who is positioned off-axis from the headlamp beam. In conventional cube-corner retroreflective articles, this cone-like spreading of retroreflected light is obtained through imperfections in the cube-cornerretroreflective elements (e.g. non-flatness of the faces, unintended tilting of the faces from their mutually perpendicular positions, etc.) and through diffraction caused because the retroreflected light exists through an aperture defined by the base edges of the three reflecting faces (see Stamm, U.S. Pat. No. 3,712,706).

However, the spreading of light from a cube corner has many important deficiencies; the cone of the retroreflected light is often too narrow for many uses that require reflected light to be seen farther off-axis; and the three-sided nature of the cube-corner reflective elements gives the retroreflected cone of light an undesirable asymmetric shape. Tanaka, U.S. Pat. No. 3,817,596 increases the divergence or spreading of light rays from the cube-corner retroreflective article by deliberately tilting the faces of the cube-corner retroreflective elements out of perpendicularity or orthogonality.

Although spreading of the light taught in U.S. Pat. No. 3,817,596 increases the observation angles from which the article may be seen by retroreflection, no effort is made to avoid the basic asymmetry that arises from the three-sided nature of a cube-corner retroreflective element.

Heenan, U.S. Pat. No. 3,833,285, changes the divergence or spreading of light from a cube-corner retroreflective article in a different manner, specifically by incorporating into the article a set of special cube-corner retroreflective elements arranged in a row. In each of these special cube-corner retroreflective elements, two of the faces intersect in a line that is aligned along the length of the row of elements and the dihedral angle at the intersection of the two faces is enlarged beyond the conventional 90 degrees, e.g., to 90° 30' with the result that the light retroreflected by those elements within the row. It is contemplated that in different elements within the row the dihedral angle may be enlarged different amounts so as to spread light into an elongated pattern. The method of construction of the invention in U.S. Pat. No. 3,833,285 is to create a die (see Heenan, U.S. Pat. No. 3,833,285 column 4, line 58 through column 5, line 11) used to impress plastic or metal foil.

Appledorn, U.S. Pat. No. 4,775,219 describes how cube-corner retroreflective articles may be individually tailored so as to distribute light retroreflected by the articles into a desired pattern or divergence profile. The retroreflective article presented in U.S. Pat. No. 4,775,219 carry one one side an array of cube-corner retroreflective elements being formed by three intersecting sets of parallel V-shaped grooves, with at least one of the sets including, in a repeating pattern, a grove side angle hat differs from another groove side angle of the same set. As a consequence of the repeating variations in grove side angle, the array of cube-corner retroreflective elements is divided into repeating sub-arrays that each comprise a plurality of cube-corner retroreflective elements in a plurality of distinctive shapes. At least one of the distinctive shapes is for a non-orthogonal cube-corner retroreflective element, by which is meant that at least one face of the element is tilted at an angle that differs from the angle which would be required for all dihedral angles within the element to be orthogonal, such an element is still regarded as a cube-corner retroreflective element herein, because it closely resembles the ideal cube-corner retroreflective element in shape and function. The overall pattern or the light, the divergence profile for the article, comprises a summation of the different light patterns in which the distinctively shaped cube-corner retroreflective elements in a sub-array retroreflect incident light, and the individual distinctively shaped light patterns can be selected to give the overall pattern a desired shape or contour. The method of construction for the invention described in U.S. Pat. No. 4,775,219 is to scribe a plate (see Appledorn, U.S. Pat. No. 4,775,219 column 10, line 63 through column 11, line 12) that is used as a master for a mould from which the retroreflective article can be cast, embossed or otherwise molded.

Benjamin, W.O. U.S. Pat. No. 0,023,828 describes an invention that provides cube-corner retroreflective articles exhibiting features of rotational symmetry and entrance angularity like that of microsphere-based articles. Such features are achieved by orienting the cube-corner elements randomly so that typically essentially no two cube-corner elements are directly joined and typically no two adjacent elements are in the same orientation. Articles constructed in this manner may have enhanced brightness over microsphere-based articles due to the higher retroreflective efficiency of the cube-corner elements as compared to microspheres.

Rowland, U.S. Pat. No. 3,684,348 for "Retroreflective Material" was to provide a flexible retroreflective shaped material utilizing cube-corners which would conform and adhere to non-planar support surfaces. While this retroreflective material has functioned very well, it has been found that, if stretched during application to a support surface, such as wrapping a tape mask therefrom helically around bicycle handlebars, the cube-corners are distorted. This renders the cube-corner faces non-orthogonal to a degree resulting in significant loss of brightness.

Rowland, U.S. Pat. No. 3,992,080 for "Retroreflective Sheet Material with Controlled Stretch and Method of Making Same" provides a novel stretchable retroreflective sheet material utilizing cube-corner retroreflectors which is easily applied under tension to support surfaces and provides good retroreflection wen stretched a predetermined amount. This is readily attained in an elongated composite retroreflective sheet material with controlled stretch. The composite material comprising a first strip of transparent flexible synthetic resin having a multiplicity of minute cube-corner formations on one surface thereof bonded to a second strip of flexible backing material of lesser length than the first strip when in a relaxed condition with the cube-corner formations disposed adjacent the second strip. The composite retroreflective sheet material is puckered in the relaxed condition with the elimination of the puckered condition providing a visual measurement of the desired degree of elongation of the composite material to avoid distortion of the cube-corner formations.

In summary each modification of the cube-corner pattern requires a new mold, form or embossing element, the construction of which is costly and time consuming. Also, once constructed, the cube-corner article is not adaptable to changing conditions and requirements.

The present invention describes a less costly and time consuming method for obtaining useful cube-corner patterns by distorting cube-corner articles via inelastic stretching such that the cube-corner faces form different permanent angular relationships with each other within a cube-corner retroreflector to produce a desired pattern. Furthermore the cube-corner patterns may be elastically stretched such that the cube corner faces form different temporary angular relationships with each other within a cube-corner retroreflector to produce a temporary desired pattern. Furthermore the article may be heated to reduce the forces necessary for stretching the article. Furthermore the article may be heated without stretching. Heating without stretching has been observed to cause some retroreflective articles to approach true retroreflectors.

SUMMARY OF THE INVENTION

In accordance with one aspect of the present invention there is provided a method for making a modified retro-reflective screen having a plurality of cube corner retro-reflectors, comprising the steps of:

providing a web having a plurality of cube corner retro-reflectors; and applying tension in at least one direction to the web so as to change the shape of the cube corner retro-reflectors.

In accordance with another aspect of the present invention there is provided a method for providing various reflective image shapes from a retro-reflective screen having a plurality of cube corner retro-reflectors, comprising the steps of:

providing a web having a plurality of cube corner retro-reflectors;

controlling the amount of tension applied to the web in at least one direction so as to be able to adjust the shape of the plurality of cube corner retro-reflectors.

In still another aspect of the present invention there is provided a system for projecting a retro-reflective image comprising;

a retro-reflective screen having a plurality of cube corner retro-reflectors, comprising the steps of:

a tension applying device for applying a controlled amount of tension applied to screen in at least one direction so as to be able to adjust the shape of the plurality of cube corner retro-reflectors; and a pair of projectors for projecting a stereoscopic image onto the retro-reflective screen for viewing by a viewer.

In still another aspect of the present invention there is provided a device for making a modified retro-reflective web having a plurality of modified cube corner retro-reflectors, comprising:

a first supply roll for holding a web of material having a plurality of cube corner retro-refectors;

a second take-up roll for receiving the web from the first supply roll;

a drive mechanism for moving the web at the first supply roll at a first velocity and the web at the second roll at a second higher velocity so apply a tension to the web so as to cause modified cube corner retro-refectors to be formed.

In another aspect of the present invention there is provided a device for making a modified retro-reflective screen having a plurality of cube corner retro-reflectors, comprising:

a holding mechanism for holding a sheet of material having a plurality of cube corner retro-reflectors; and a tension applying mechanism for providing a tension on the sheet in at least one direction to so as to change the shape of the cube corner retro-reflectors.

In yet still another aspect of the present invention there is provided a device for making a sheet having a plurality of modified cube corner retro-reflectors, the device designed to be placed in an oven, comprising:

a holding mechanism for holding the sheet; and a tension applying mechanism for placing tension on the sheet in at least one direction to so as to change the shape of the cube corner retro-reflectors.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which:

FIG. 2a is a cut sheet of a material for making a retroreflective screen in accordance with the present invention;

FIG. 2b is a schematic diagram of a device for used to make a retroreflective screen using the cut sheet of FIG. 2a;

FIG. 4b is top view of the system of FIG. 4a;

FIG. 6a is a detail drawing of prior art unmodified cube-corner screen element;

FIG. 6b is a detail drawing of a modified cube-corner screen element in accordance with the present invention;

FIG. 6c is a schematic diagram illustrating how a prior art retroreflective screen returns light directly to the projection source;

FIG. 6d is a schematic diagram illustrating how the retroreflective

DETAILED DESCRIPTION OF THE INVENTION

Figure 1:
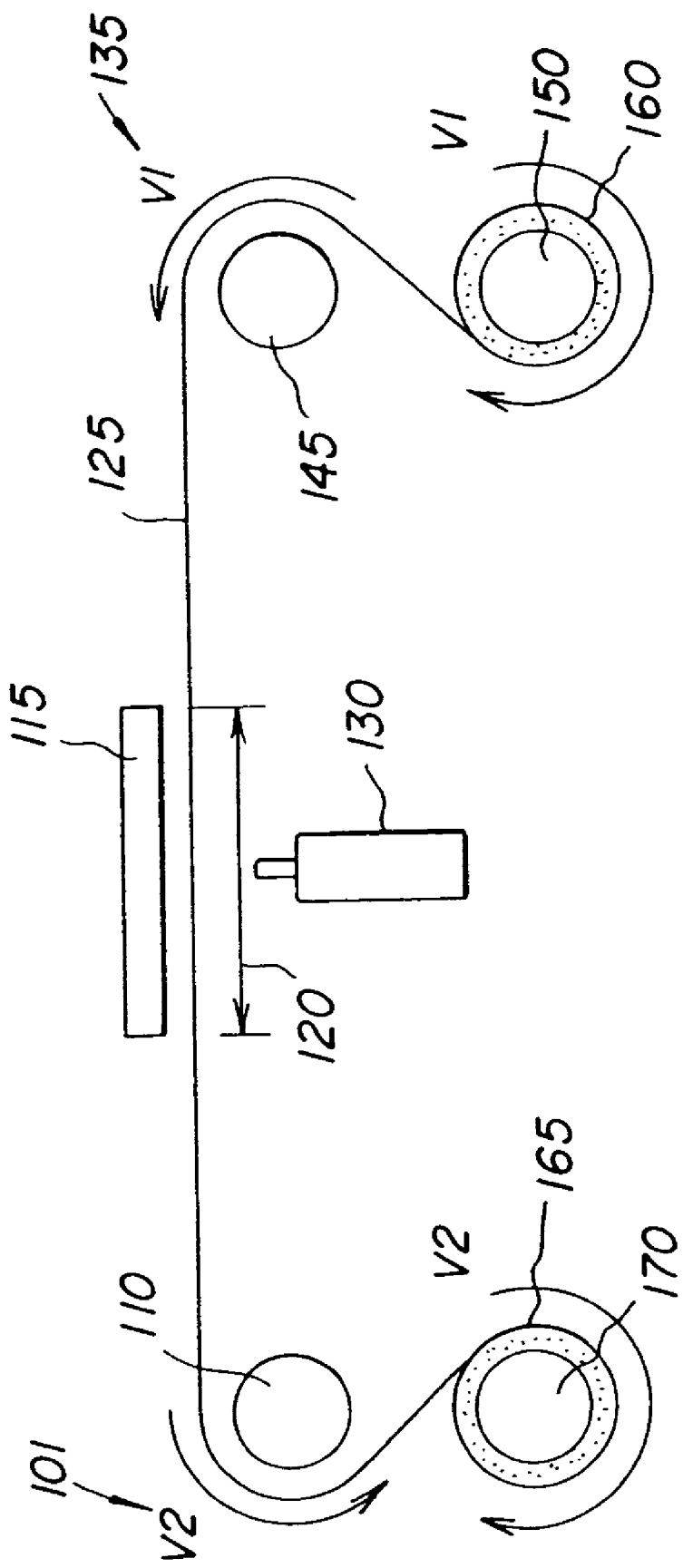
FIG. 1 is a schematic diagram of an apparatus for making a continuous web in accordance with the present invention.

FIG. 1 is a schematic diagram of a device 100 for making a modified retro-reflective screen having a plurality of cube corner retro-reflectors wherein the initial shape of said plurality of cube corner retro-reflectors. In FIG. 1 there is illustrated a web 125 of made of a retro-reflective material, where the web 125 is made of Mylar. The web 125 has plurality of retro-reflectors each having a shape of a substantial triangle having a size ranging from about 100 microns to 500 microns. FIG. 6a illustrates the initial shape of one of the cube corners retro-reflectors and FIG. 6*b* illustrates the shape of modified cube corners retro-reflectors made in accordance with the present invention. The web 125 is preferably constructed so that the web 125 has a thickness in the range of about 0.1 mil. to 5 mil. The web 125 is heated by a heater 115 such that a sufficient amount of heat is applied to the web 125 so as to raise the temperature of the web 125 to a temperature in the range of about 110° to 130° centigrade as the web 125 is being transported from web supply roll 160 on a supply spindle 150, which provides a web having a plurality of cube corner retro-reflectors, around the supply idling roller 145, through the heating station 116, around the take up idling roller 110 to take up roll 165 on the take up spindle 170. The web supply roller 160 produces a velocity V1 of web 125 that is less than the take up velocity V2 of the web 125 at take up roller 165. This applies tension in at least one direction to the web 125 so as to change the shape of said cube corner retro-reflectors on web 125. The amount of said tension to be applied is determined so as to provide a predetermined retro-reflective image shape when the tension of web 125 material is removed, the web 125 stretches elastically between the heater 115 and the supply roll 160. The web 125 also stretches elastically between the heater 115 and the take up roll 165. However the web 125 stretches uniformly both elastically and inelastically in the heated region 120 as heat is applied to the web 125 during the application of said tension to the web 125. A sufficient amount of heat is applied so as to raise the temperature of the web 125 to a temperature in the range of about 110° to 130° centigrade. This inelastic stretch is set into the web 125 so that the angles of said cube corner retro-reflector are changed for minimum eye crosstalk (incidental image going to the wrong eye) in the range of about 1% to 5% as the web passes around the take up idling roller 110. A retroreflective pattern sensing device 130 may be provided so that the shape of said retro-reflective pattern is monitored as tension is being applied. The device 130 may monitor the amount of stretch, which can be related to the actual shape of the cube corner retro-reflectors. Supply velocity V1 of the web 125 at roller 145 and the velocity V2 of the web 125 at roller 110 are controlled in such a manner that tension is applied in an increasing matter until said predetermined retro-reflective image is obtained.

Figure 2:
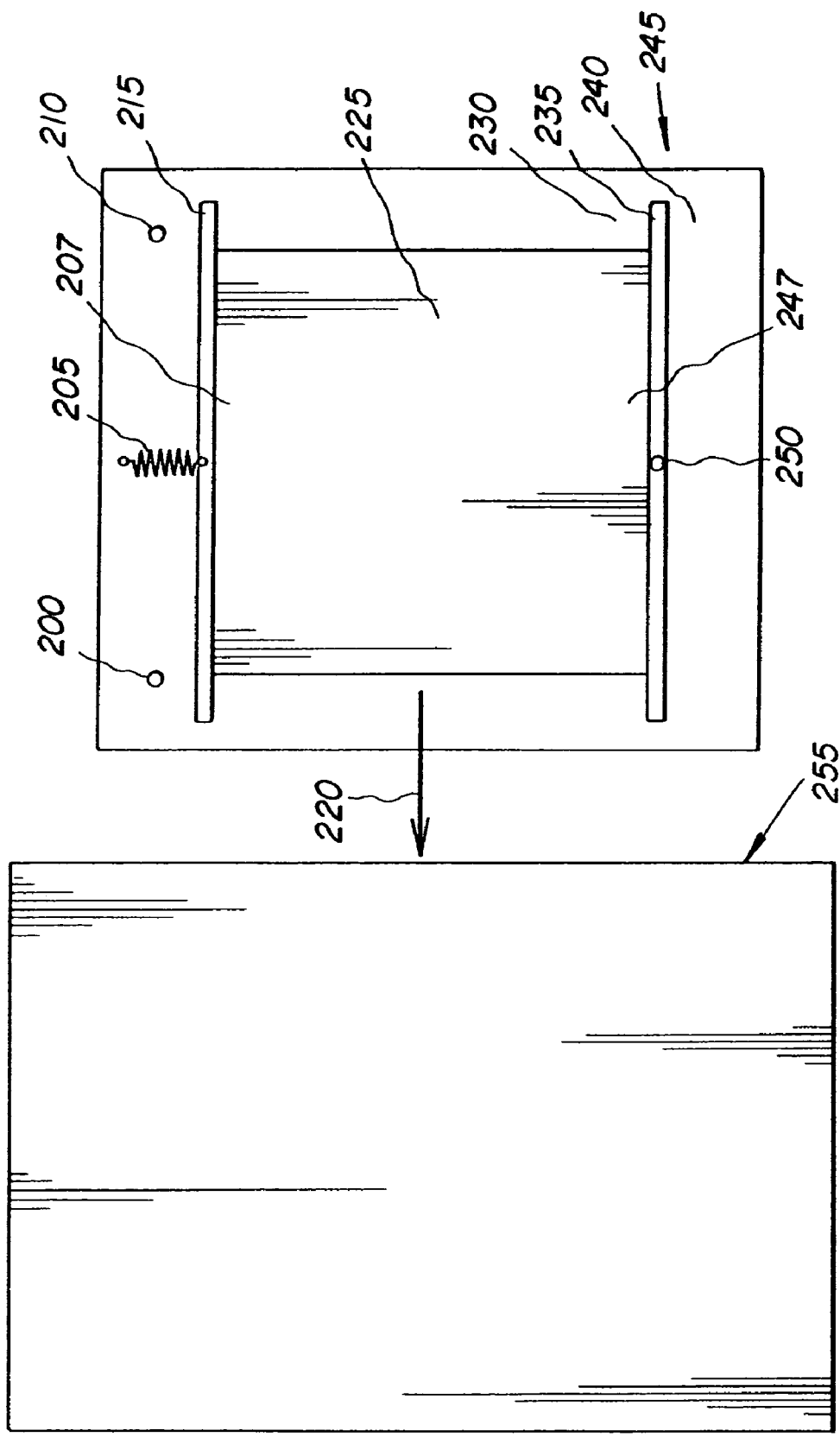

FIG. 2*b* shows another device 210 for making a modified retroreflective screen having a plurality of cube corner retro-reflectors in accordance with the present invention where the initial shape of the plurality of cube corner retro-reflectors is in the shape of a substantial triangle having a size ranging in about 100 microns to 500 microns. In FIG. 2*a*, a sheet 225 of retro-reflective material is illustrated for use in device 210, wherein the sheet 225 is made of Mylar, and has a thickness between about 0.1 mil. To 5 mil., Referring back to FIG. 2*b*, the sheet 225 is placed in device 210 which is heated in an oven 255 so that a sufficient amount of heat is applied so as to raise the temperature of the sheet 225 to a temperature in the range of about 110° to 130° centigrade as the sheet 225 is being stretched by the tension spring 205 of device 210. In particular, one end 207 of the sheet 225 is attached to the spring loaded tension bar 215 and the other end 247 of the sheet 225 is attached to the pivot bar 235. A tension spring 205 is attached to the spring loaded tension bar 215 and also to the base plate 230. The pivot bar 235 is attached to the base plate 230 through a pivot pin 250 in such a manner that the pivot bar 235 is free to rotate about the pivot pin 250. The tension spring 205 is mounted under sufficient tension such that when the assembled system 245 is heated in an oven 255 to said temperature the sheet 225 stretches both elastically and inelastically to a predetermined length define by the placement of the left stop 200 and right stop 210. The system 245 is then removed from the oven 255 and allowed to cool. When the tension is removed from the sheet 225 by removing the tension spring 205, the inelastic stretch of the sheet 225 will change the angles of said cube corner retro-reflector are changed in the range of about of 1% to 5% and produce the desired optical spread of the retroreflected image.

Figure 3:
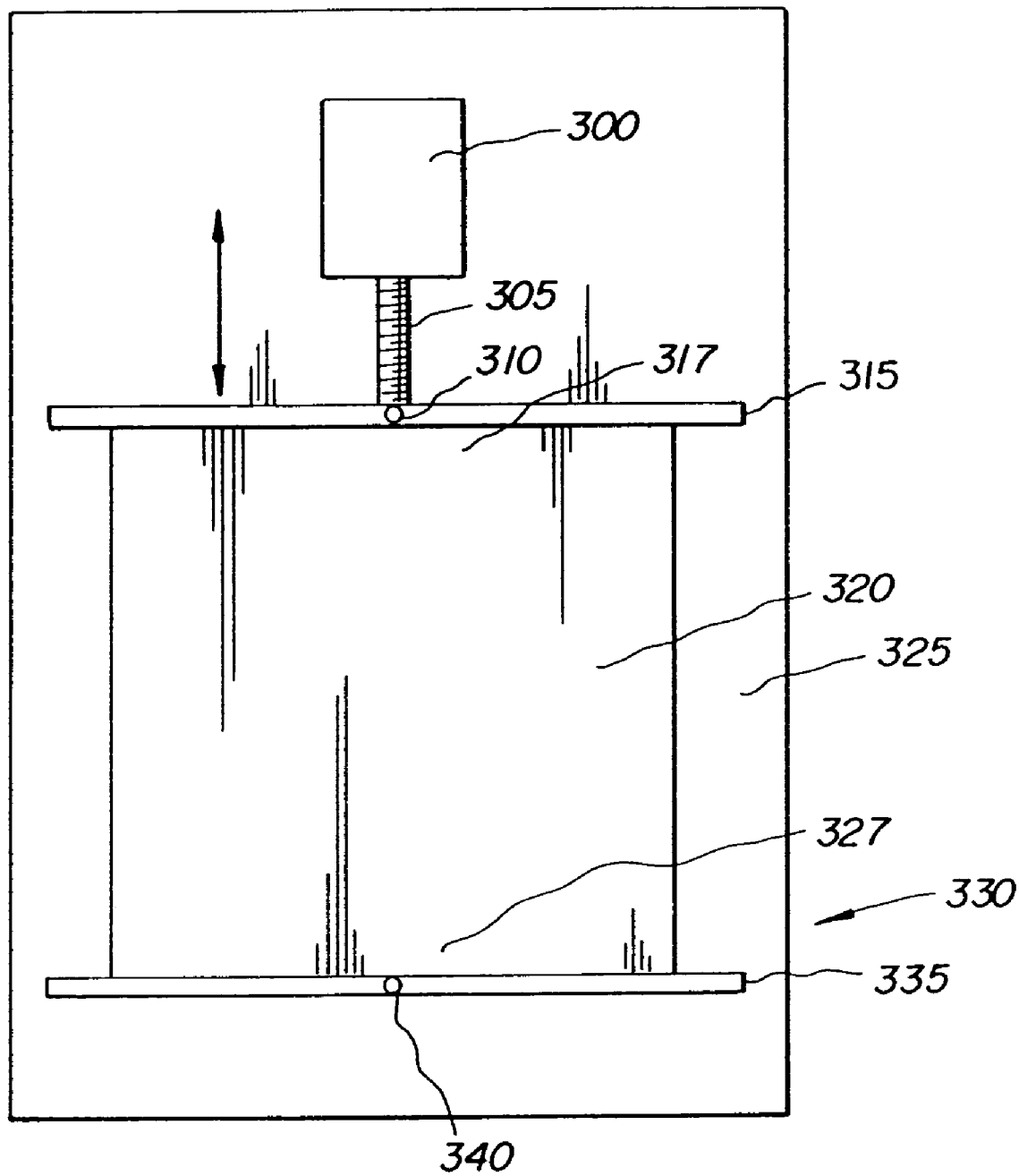
FIG. 3 is a view similar to FIG. 2a illustrating the cut sheet of FIG. 2 mounted in the device of FIG. 2b.

Referring to FIG. 3 there is illustrated another method for making a modified retro-reflective screen having various reflective image shapes from a retro-reflective screen having a plurality of cube corner retro-reflectors. In this method a sheet 320 having a plurality of cube corner retro-reflectors is provided in device 302. A controlled amount of tension is applied to the sheet 320 in at least one direction so as to be able to adjust the shape of said plurality of cube corner retro-reflectors where the initial shape of said plurality of cube corner retro-reflectors is in the shape of a substantial triangle having a size ranging in about 100 microns to 500 microns as illustrated in FIG. 6*a*. Sheet 320 is made of an retroreflective material, and in the embodiment illustrated the sheet 320 is made of Mylar, having a thickness between 0.1 mil. To 5 mil. The sheet 320 is elastically stretched and tension is maintained at a particular desired tension so as to provide a desired retro-reflective image area at room temperature. One end 317 of the sheet 320 is attached to the motor driven tension bar 315 and the other end 327 of the sheet 320 is attached to the pivot bar 335. A linear drive member 305 is attached to the motor driven tension bar 315 and also to the linear drive motor 300. The linear drive motor 300 is also attached to the base plate 325. The pivot bar 335 is attached to the base plate 325 through a pivot pin 340 in such a manner that the pivot bar 335 is free to rotate about the pivot pin 340. Likewise the motor driven tension bar 315 is connected to the linear drive member 305 through a drive pivot pin 310 in such a manner that the motor drive tension bar 313 is free to rotate about the drive pivot pin 310. The forgoing arrangement equalizes the tension applying force across the width of the sheet 320. The linear drive member 305 is connected to the linear drive motor 300. The base of the linear drive motor 300 is attached to the base plate 325. The linear drive motor 300 provides sufficient force to control the amount of tension applied to the sheet 320 in at least one direction so as to be able to adjust the shape of said plurality of cube corner retro-reflectors. This tension is maintained at a particular desired tension so as to provide a desired retro-reflective image area. Furthermore it is possible to vary the tension so as to modify the shape of said retro-reflective image area while said screen is in use.

Figure 4A:
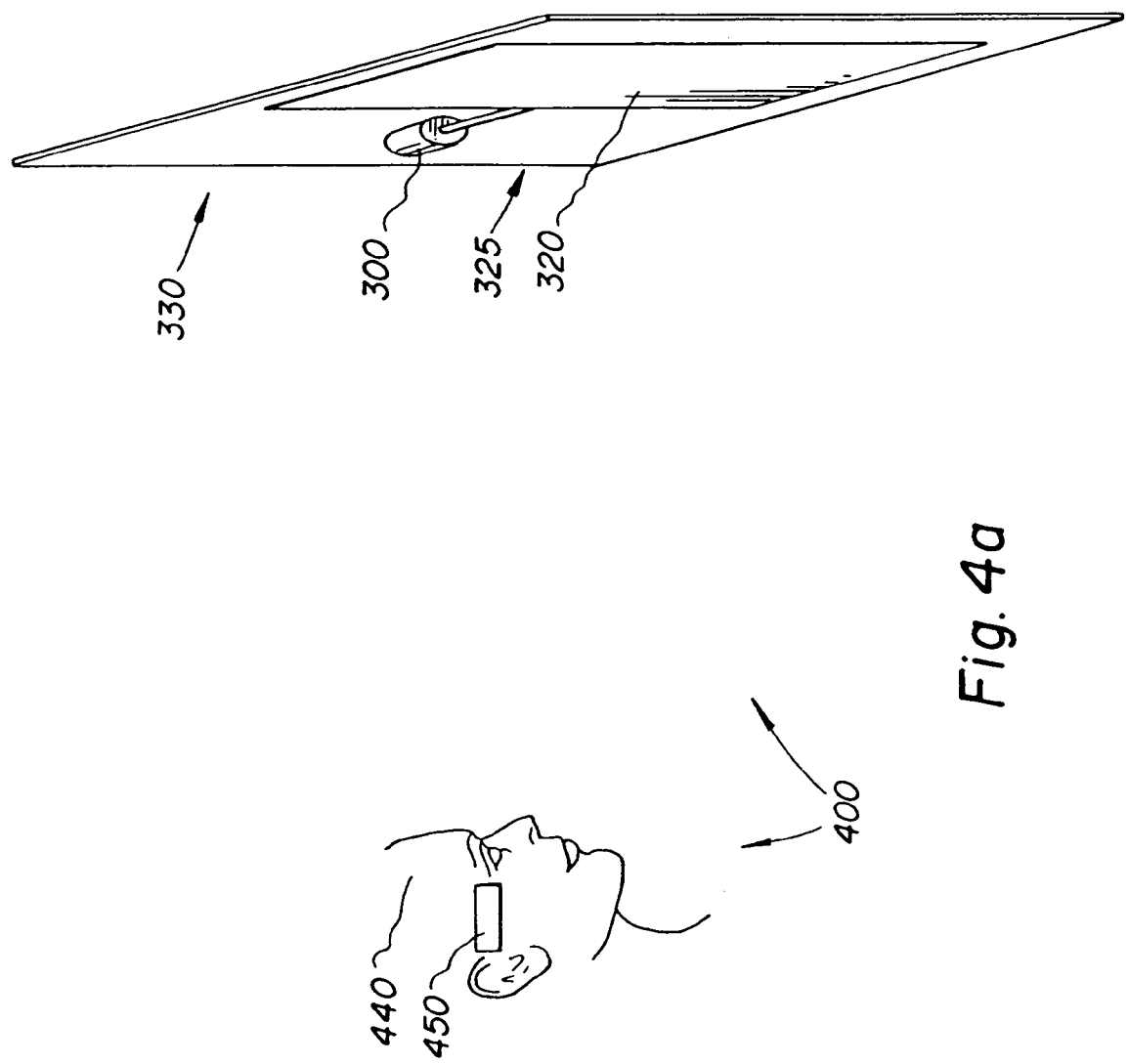
FIG. 4a is a schematic diagram of a retroreflective viewing system made in accordance with the present invention.
Figure 4B:
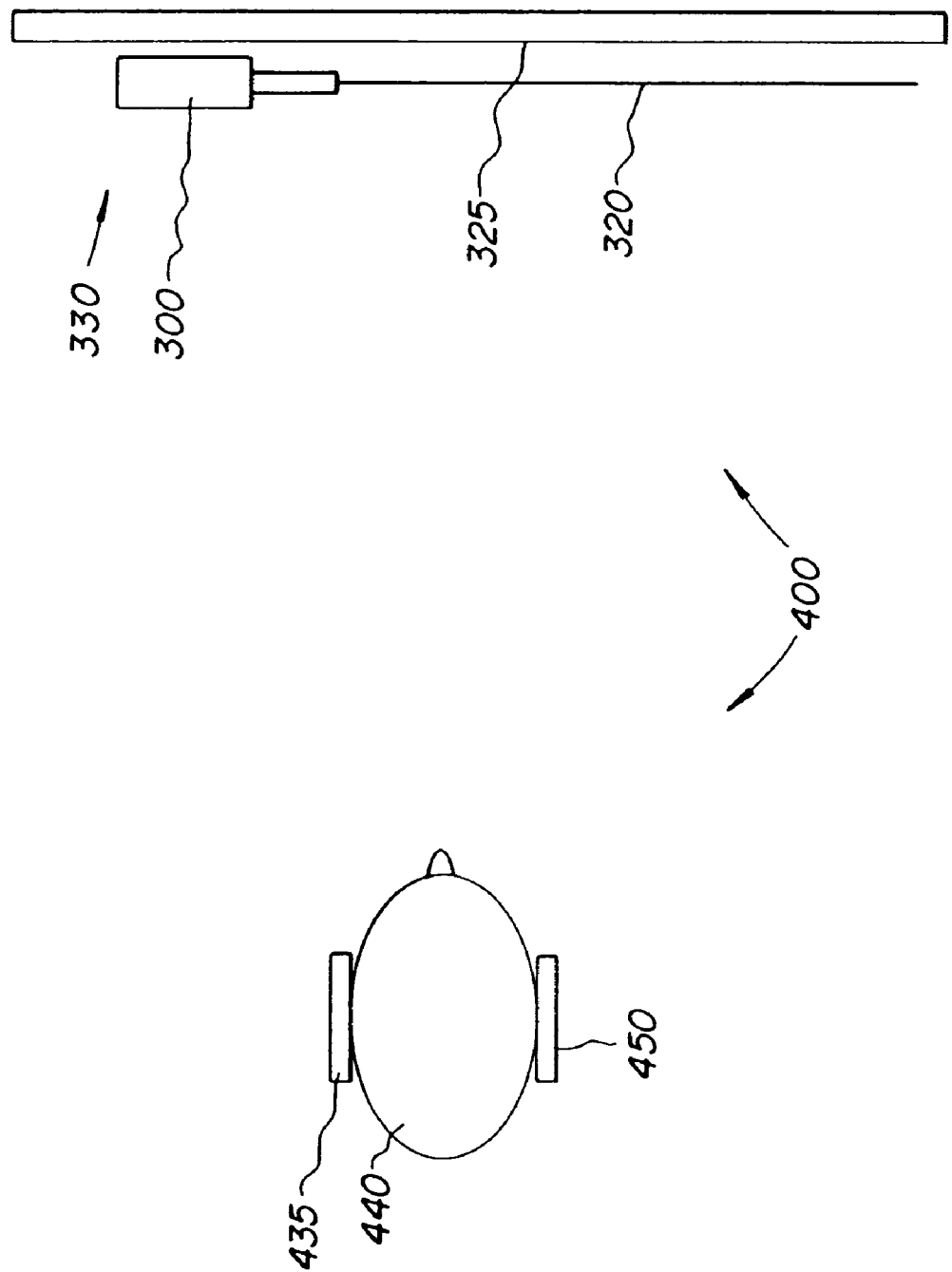

FIGS. 4*a* and 4*b* illustrate a system 400 in accordance with the present invention for projecting a retro-reflective image comprising a retro-reflective screen having a plurality of cube corner retro-reflectors. In system 400 a tension applying device/motor 300 is used for applying a controlled amount of tension to screen in at least one direction so as to be able to adjust the shape of said plurality of cube corner retro-reflectors. A pair of projectors 450 are provided for projecting a stereoscopic image onto retro-reflective screen 320 for viewing by a viewer 440. Like numbers indicate like parts and operation as previously described. Some elements are not illustrated for purposes of clarity. Retroreflective sheet 320 is placed under tension and elastically stretched by a linear drive motor 300 that is attached to a base plate 325. One end of the sheet 320 is attached to the linear drive motor device 300 and the other end of the sheet 320 is attached to the base plate 325 to create the image viewing system 330.

Viewer 440 observes images on the sheet 320 generated by the right eye projector 450 and the left eye projector 435. Tension is applied to the sheet 320 such that the retroreflected pattern due to the right eye projector 450 is seen only by the right eye of the viewer 440 and the retroreflected pattern due to the left eye projector 435 is seen only by the left eye of the viewer 440 as illustrated by FIGS. 6c and 6d as described later herein.

Figure 5A:
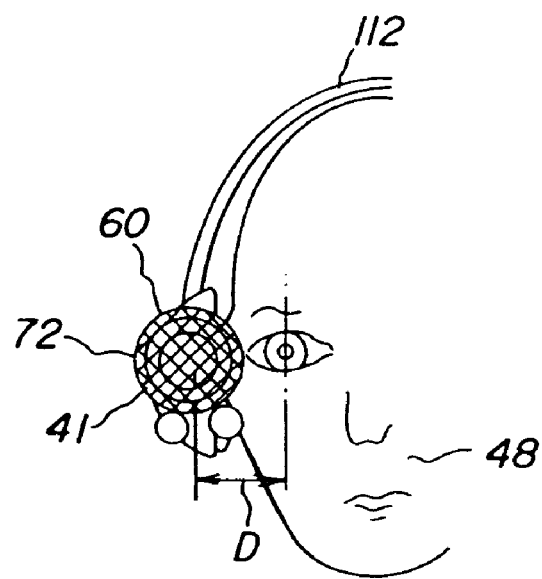
FIG. 5a is a frontal view illustrating how a prior art retroreflective screen returns light directly to the projection source.

For image projection onto a cube-corner screen, the screen effectively forms an "image" of the exit pupil of the projection lens back onto the projection lens exit pupil. When a ray of light enters a 3-sided, cube-corner element whose internal surfaces are reflective and intersect at a 90 degree angle, the entering light reflects off the cube's internal walls until exiting on the same heading that brought the light ray into the cube. Cube-corner screen material has a surface composed of many such small cube-corner elements. The crosshatching in FIG. 5a illustrates the reflected image area produced with respect to the projector 40.

Figure 5B:
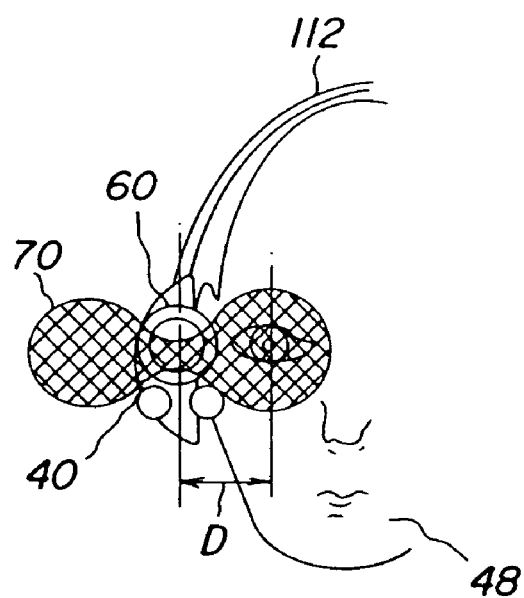
FIG. 5b is a frontal view illustrating how the retroreflective screen of the present invention returns light to the observer's eyes.

By selectively modifying the cube-corner's internal angles of intersection from 90 degrees, the light ray's exit path from the cube-corner is made to differ from the entrance path, causing the trajectory of the reflected returning rays to deviate from the conventional retro-reflective condition. For a modified cube-corner screen comprising a plurality of such modified cube-corners, light reflected from the modified screen no longer forms an "image" of the projector exit constrained to the immediate area of (and radially surrounding) the projection lens assembly 60 referred to above. Instead, the modified screen forms a reflected "image" of the image exiting the projector 40 to an area around the projection lens assembly 60. The nature of the expanded area of reflection can be controlled by the deviation of cube-corner dihedral angles from 90 degrees. In the preferred embodiment, the angles are modified so the exiting light rays form a horizontally elongated "image" of the projector exit pupil in the plane of the projector lens exit pupil as best illustrated by reference to FIG. 5b. As can be seen, that the reflected image of a modified cube-corner forms an elongated image area 70 (indicated by crosshatching in the illustration) centered on the projector lens assembly 60 as opposed to the generally circular reflective image area 72 of the standard cube-corner. The circular area of a prior art cube-corner display screen is not seen in a manner suitable for the observer, as the reflected image is reflected toward the associated projector. In contrast to the use of a modified cub-corner reflective screen made in accordance with the present invention, the projector 40 is positioned adjacent the head 48 so that a portion of the reflected image area 70 for the projector will cover the adjacent eye 44 so that the eye 44 can easily view the reflected image form the single adjacent projector.

FIG. 6a shows an element from a conventional cube-corner retroreflective screen, which provides a reflected image area illustrated by FIG. 6c. FIG. 6b shows an element from a modified cube-corner retro-reflective screen made in accordance with the present invention which would be expected to provide the reflected image results illustrated in FIG. 6d. U.S. Pat. No. 4,775,219 teaches the preparation of tooling for the production of the type of modified cube-corner reflector element shown in FIG. 6b. The element of FIG. 6b differs from the conventional element of FIG. 6a in that the angles α are wider than the 90 degree angles β of FIG. 6a. The deviation of angles α from 90 degrees causes a deviation from true retroflection such that the aforementioned horizontal elongation of the retroreflection of the "image" of the projector lens assembly 60 is achieved.

FIG. 6c illustrates how a screen of conventional cube-corner retroreflective material 80 returns a projected light beam 82 substantially to the projection lens 41. FIG. 6d illustrates that images projected onto a screen 14 of modified retroreflective cube-corner screen material are reflected as sufficiently elongated image areas that cover the eye closest to each projector 38, 40 without intersecting the other eye thus minimizing crosstalk of left and right images. Light from the modified retro-reflective screen 14 thus is returned by the screen directly to the eyes 44 of the observer 16.

The invention has been described in detail with particular reference to certain preferred embodiments thereof, but it will be understood that variations and modifications can be effected within the scope of the invention.

PARTS LIST 14 modified retro-reflective screen
16 observer/observer's head
38,40 image projectors
41 projection lens
44 observer eyes
48 observer head
60 lens assembly
70 circular reflective image area
72 round image area
80 regular retroreflector screen
82 light beams
101 take up velocity V2
110 take up idling roller
112 headband
115 heater
116 heating station
120 heated region
125 web
130 pattern sensing device
135 Supply velocity V1
145 supply idling roller
150 supply spindle
160 supply roll
165 take up roll
170 take up spindle
200 left stop
205 tension spring
207 One end of the sheet 225
210 right stop
215 spring loaded tension bar
220 movement into the oven
225 sheet
230 base plate
235 pivot bar
240 base plate
245 assembled system
247 other end of the sheet 225
250 pivot pin
255 oven
300 linear drive motor
305 linear drive member
310 drive pivot pin
313 motor drive tension bar
315 motor driven tension bar
317 One end of the sheet 320
320 sheet
325 base plate
327 other end of the sheet 320
330 image viewing system
335 pivot bar 340 pivot pin
400 system
435 left eye projector
440 viewer
450 right eye projector

What is claimed is:

1. A method for making a modified retro-reflective screen having a plurality of cube corner retro-reflectors having internal angles of intersection, comprising the steps of:
    providing a web having a plurality of cube corner retro-reflectors; and
    applying tension in at least one direction to said web so as to change the shape of said internal angles of intersection of said cube corner retro-reflectors so that the reflected rays which form a desired image are directed to a new designated area to provide a reflected image which is elongated or expanded over that of a screen not so modified.

2. A method according to claim 1 further comprising the step of applying of heat to said web during the application of said tension to said web.

3. A method according to claim 1 wherein the internal angles of intersection are changed in the range of about of 1% to 5%.

4. A method according to claim 1 wherein the amount of said tension is applied so as to provide a predetermined retro-reflective image shape.

5. A method according to claim 4 wherein the shape of said retro-reflective image is monitored as tension is being applied.

6. A method according to claim 5 wherein said tension is applied in an increasing manner until said predetermined retro-reflective image is obtained.

7. A method according to claim 2 wherein a sufficient amount of heat is applied so as to raise the temperature of said web to a temperature in the range of 110° to 130° centigrade.

8. A method according to claim 1 wherein said web has a thickness in the range of about 1 mil. to 5 mil.

9. A method according to claim 1 wherein the initial shape of said plurality of cube corner retro-reflectors is in the shape of a triangle, each of said plurality of cube corner retro-reflectors having a size ranging in about 100 microns to 500 microns.

10. A method for providing various reflective image shapes from a retro-reflective screen having a plurality of cube corner retro-reflectors having internal angles of intersection, comprising the steps of:
    providing a web having a plurality of cube corner retro-reflectors;
    controlling the amount of tension applied to said web in at least one direction so as to be able to adjust the shape of said internal angles of intersection of said plurality of cube corner retro-reflectors that the reflected rays which form a desired image are directed to a new designated area to provide a reflected image which is elongated or expanded over that of a screen not so modified.

11. A method according to claim 10 wherein the tension is varied so as to modify the shape of said retro-reflective image area while said screen is in use.

* * * * *